Nov. 18, 1958   G. C. TREVARTHEN   2,860,934
PISTON
Filed June 14, 1954
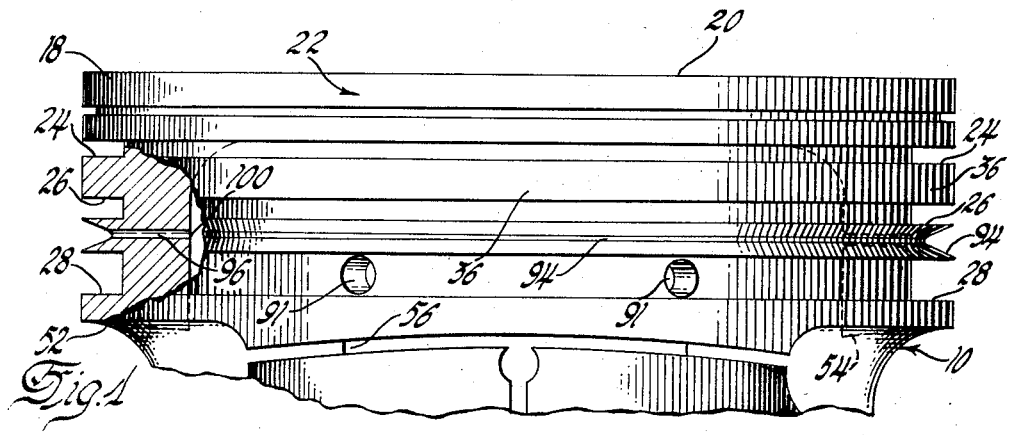
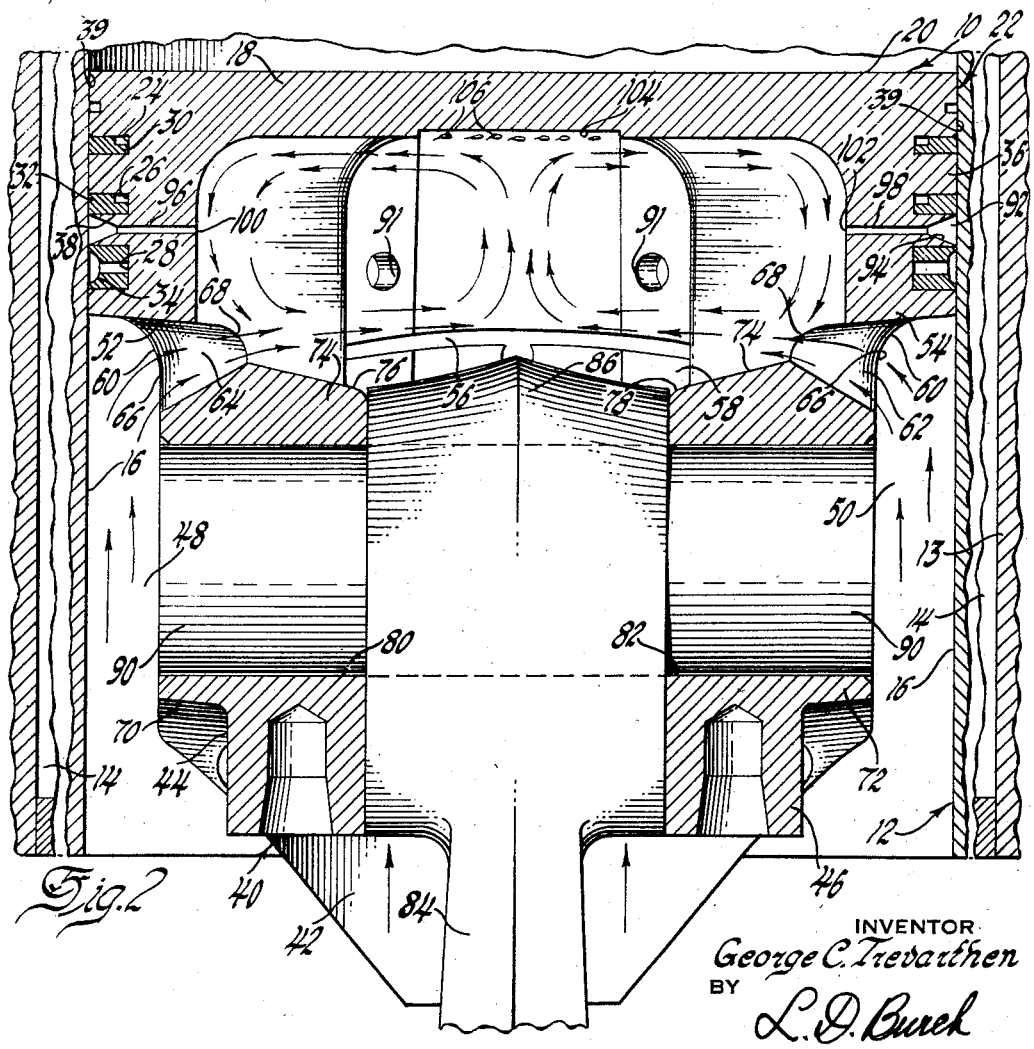
INVENTOR
George C. Trevarthen
BY
L. D. Burch

United States Patent Office 2,860,934
Patented Nov. 18, 1958

2,860,934

PISTON

George C. Trevarthen, Detroit, Mich., assignor to General Motors Corporation, Detroit, Mich., a corporation of Delaware Application June 14, 1954, Serial No. 436,379

10 Claims. (Cl. 309—10)

The present invention relates to internal combustion engines and more particularly to the pistons therefor.

It has been found advantageous to employ an oil ring on reciprocating pistons of an internal combustion engine. The oil ring is normally disposed below the compression rings for wiping excess oil from the cylinder walls. Thus the oil ring moves along the cylinder wall ahead of the compression rings and prevents an excessively thick film of oil forming on the cylinder walls. If this ring fails to wipe the cylinder walls sufficiently clean, the remaining oil film will not only interfere with the sealing operation of the compression rings but also the oil in this film will be burned in the combustion chamber and wasted.

Although the use of oil rings improves the operation of an internal combustion engine, it has been found that during the compression, expansion, and exhaust strokes a certain amount of gases escape or are "blown by" the compression rings and cause a pressure differential to exist across the oil ring. Also during the intake stroke the vacuum above the piston will cause a flow of gases past the rings. This will result in a vacuum being created in the ring seats behind the rings. Since there will then be no gas pressure behind the rings to hold their face against the cylinder walls, they will be dependent upon the resilient diametral expansion of the ring. Under such conditions the oil ring must control the oil flow more effectively. This effectiveness may be accomplished by not allowing the intake vacuum to establish a pressure differential across the oil ring. An expansion chamber may be provided between the compression rings and the oil ring so that the "blow by" gases may be stored therein. Thus before a vacuum can be imposed on the oil ring, it will be necessary to first exhaust the gases in this chamber. Due to space limitations, it is impossible to make the expansion chamber large enough to store sufficient gases to last for the entire cycle. Accordingly, attempts have been made to vent the chamber to the interior of the piston by passages through the piston wall. Although this greatly reduces the pressure differential across the oil ring by allowing the gases to flow into and out of the chamber, this has not proved entirely satisfactory as there is normally a large volume of oil spray and mist created in the crankcase. This oil spray which is always present inside of the piston may be thrown near or into the inner vent orifice where it may be drawn into the vent by the air flow used to reduce the pressure drop across the oil ring. This action would decrease the effectiveness of the vent and add to the volume of oil consumed. The placement of the vent and the control of the amount of oil present at the vent is critical.

It is now proposed to provide a piston having means for effectively reducing the pressure differential across the oil ring and to prevent any oil spray or mist present inside of the piston from interfering therewith. The means may include an annular recess or channel that is formed in a ring land between the oil ring and the compression rings to collect any "blow by" gases. Pressure relief vents may extend through the land to interconnect the channel with the interior of the piston thus allowing a free flow of gases between the center of the piston and the channel. In order to insure that there will be no oil present in the air flowing through the vents, the inner ends of the vents are preferably disposed immediately above the pin bosses. Thus the pin bosses will form an "oil shadow" about the entrance to the vents and reduce the amount of oil present in the air around the entrance. In addition, to even further reduce the volume of splash oil and spray present, a radial passage may extend through the skirt portion of the piston to form an opening adjacent the inner end of the vent. If the outer end of this passage communicates with a recess between the piston and the cylinder wall and a shoulder or scoop is formed in the recess adjacent the outer end of this passage, reciprocating movement of the piston will create a high velocity blast of air through the passage adjacent the inner end of the vent. As the air flows inwardly through this passage, it will develop a toroidal flow pattern. This will create a centrifugal separation of the oil from the air, and any air that enters the vent will be free of oil. Thus the vent will be maintained free and clear of oil to allow adequate ventilation therethrough.

In the one sheet of drawings:

Fig. 1 is a fragmentary side elevation of a piston, portions thereof being broken away to more clearly show the present invention.

Fig. 2 is a fragmentary cross sectional view of an engine showing the piston of Fig. 1 in cross section.

Referring to the drawing in more detail the present invention may be embodied in any suitable piston 10. In the present instance the piston 10 reciprocates in a cylinder 12 of an engine. The cylinder 12 may be disposed in a cylinder block 13 having a water jacket 14 for maintaining the cylinder walls 16 at satisfactory operating temperatures.

The piston 10 may include an upper end 18 which has a surface 20 suitable for forming one wall of a combustion chamber. A ring belt 22 may extend downwardly from the upper end 18. The ring belt 22 includes a plurality of annular ring receiving grooves 24, 26 and 28 adapted to receive annular piston rings 30, 32 and 34 that slidably engage the cylinder walls 16. In the present instance, the two grooves 24 and 26 closest to the upper end 18 are adapted to receive compression rings 30 and 32 for sealing the pressure in the combustion chamber. The lower groove 28 or the one farthest from the upper end 18 is adapted to receive an oil ring 34. Each of the ring receiving grooves 24, 26 and 28 may be separated from the grooves adjacent thereto by lands 36 and 38 that project radially from the ring belt 22. The exterior of these lands preferably have a diameter slightly smaller than the inside diameter of the cylinder so as to form a clearance space 39 therebetween.

In the present instance, the skirt 40 is of the so-called "slipper type" in which a pair of diametrically disposed thrust faces 42 are adapted to slidably engage the cylinder walls 16. The sliding action of these thrust faces 42 on the cylinder walls 16 will assist in retaining the piston 10 in substantial axial alignment within the cylinder 12. The adjacent ends of the thrust faces 42 may be secured together by chordal webs 44 and 46. If the outer surface of the webs 44 and 46 are set inwardly from the exterior of the piston 10, recessed spaces 48 and 50 will be formed between the webs 44 and 46 and the cylinder wall 16. In the present instance, these spaces 48 and 50 are disposed below the ring belt 22. Thus the bottom of the ring belt 22 may project over the upper end of the recessed spaces 48 and 50 to form shoulders 52 and 54 adjacent the cylinder walls 16. The upper edges of the thrust faces 42 may be separated from the ring belt 22 by expansion slots 56 which are positioned to compensate for relative thermal expansion between the skirt 40 and ring belt 22.

It may thus be seen that the piston 10 is hollow and has a chamber 58 that extends up through the skirt 40 into the ring belt 22 from the open lower end.

In order to secure the skirt 40 to the ring belt 22, pairs of piers 60 may be disposed on each side of the piston 10 above the webs 44 and 46. The upper ends of the piers 60 may be formed on the inside of the ring belt 22 while the lower ends thereof may be secured to and form an integral part of the chordal webs 44 and 46. The piers 60 in each pair may be chordally spaced from each other to form a passage 62 and 64 therebetween. The outer ends 66 of each of these passages 62 and 64 will communicate with the upper ends of the recessed spacers 48 and 50 while the inner ends 68 will communicate with the chamber 58 in the interior of the piston 10. It can thus be seen that the skirt 40 is secured to the ring belt 22 by means of these structural piers 60.

Pin bosses 70 and 72 may be formed in each of the webs 44 and 46. Each of the present pin bosses 70 and 72 include a cylindrical portion 74 which is disposed between the piers 60 so that the inner ends 76 and 78 project into the interior of the piston 10 and the outer ends are substantially flush with the chordal webs 44 and 46. A bearing 80 and 82 may be formed in each pin boss 70 and 72 so as to extend radially therethrough. Thus it may be seen that there will be two diametrically disposed pin bosses which have two bearings 80 and 82 disposed in substantial alignment with each other.

A connecting rod 84 may be provided in order to drivingly connect the piston 10 to the engine crankshaft (not shown). In the present instance, the upper end 86 of the connecting rod 84 is adapted to be disposed between the inner ends 76 and 78 of the pin bosses 70 and 72. A passage may extend through the upper end 86 in substantial alignment with the bearings 80 and 82. Thus a wrist pin 90 may be disposed in this passage and bearings 80 and 82 for coupling the connecting rod 84 to the piston 10.

During operation of the engine, the piston 10 will reciprocate longitudinally through the cylinder 12. During such movement of the piston 10, the rings 30, 32 and 34 will slide along the cylinder walls 16 to form a seal against the flow of gases. However, it should be noted that there will be a certain amount of gases which escape by flowing past the rings 30 and 32 and through the clearance space 39. As these gases flow downwardly past the two compression rings 30 and 32, they may collect in the space between the compression ring 32 and the oil ring 34. This in turn will cause a pressure differential to build up across an oil ring 34. Unless relieved this pressure differential will interfere with the proper seating of the oil ring 34 and thus result in improper wiping action thereof.

In order to minimize the harmful effects of such a pressure differential across the oil ring 34 in addition to the passages 91 in the oil ring groove 28, an expansion chamber 92 may be provided between the oil ring 34 and the lower compression ring 32. In the present instance the land 38 between these two rings is provided with an annular V-shaped channel 94 that is recessed so as to be inside of the outside diameter of the ring belt 22 and extends completely around the piston 10. This channel 94 and the cylinder wall 16 will form the expansion chamber 92 which will collect any gases that may pass through the clearance space 39 or "blow by" the compression rings 30 and 32.

Relief vents 96 and 98 may be provided for dissipating any pressure that may build up as a result of the gases collecting in this chamber 92. In the present instance these relief vents 96 and 98 include two relatively small radial passages that extend through the ring belt 22. One end of each of the passages 62 and 64 communicates with the bottom of the channel 94 while the other ends form entrance openings 100 and 102 on the inside of the piston 10. This will allow the gases to flow freely between the chamber 92 and the center of the piston 10. Since the pressure in the center of the piston 10 is substantially the same as the pressure on the lower side of the oil ring 34, the pressure differential across the oil ring 34 will be retained at substantially zero at all times. Thus any tendency of the pressure differential to interfere with the seating of the oil ring 34 will be eliminated and the ring 34 may more effectively wipe the oil film from the cylinder walls 16.

It should be noted that during operation of the engine, there is a large amount of splash oil and mist created in the crankcase and a considerable amount of this oil will be thrown up into the cavity 58 in the interior of the piston 10. Unless provision is made for separating such oil from the air, there will be a large volume of oil present in the atmosphere around the entrance openings 100 and 102 and any air entering the vents 96 and 98 will be carried through the vents into the chamber 92. This oil will either plug the vents 96 and 98 and/or collect in the chamber 92 where it will interfere with the operation of the rings 30, 32 and 34. Thus the entrance openings 100 and 102 are preferably disposed adjacent the inner ends of the passages 62 and 64 and immediately above the pin bosses 70 and 72 in their "oil shadow." Thus the pin bosses 70 and 72 form a shield that will reduce the amount of oil present in the atmosphere around the entrance openings 100 and 102 and the volume of objectionable oil particles carried into the vents 96 and 98 will be greatly reduced.

During the compression, expansion and exhaust strokes of the working cycle, the pressure above the piston 10 will be greater than that in the crankcase. Thus there will be a tendency for the gases in the combustion chamber to be blown downwardly through the clearance space 39 past the compression rings 30 and 32 and collect in the chamber 92. Since the vents 96 and 98 interconnect the chamber 92 with the interior of the piston 10, these gases may then flow into the interior of the piston 10, thus insuring substantially the same pressure on each side of the oil ring 34. During the intake portion of the cycle, the pressure in the combustion chamber will be considerably less than that in the crankcase and there will be a tendency for the air to flow from the chamber 92 upwardly through the clearance space 39 past the compression rings 30 and 32 into the combustion chamber. When this occurs the air inside of the piston 10 will flow through the vents 96 and 98 into the chamber 92. Thus the pressure on both sides of the ring will be substantially equal; thus there will be no tendency for oil to be forced past the oil ring either through the joint gap, the face of the ring or past the sides and around the back of the ring. Any oil particles present around the entrance openings 100 and 102 will be carried into the chamber 92 along with the air flowing therethrough. As previously explained, by placing the openings 100 and 102 formed by the vents 96 and 98 above the pin bosses 70 and 72, the bosses will act as a shield forming an "oil shadow" and reducing the possibility of oil being drawn into the vents 96 and 98.

In addition, it should be noted that when the piston 10 is descending in the cylinder 12 during the intake stroke, the air will flow in the general pattern shown by the arrows. That is when the piston 10 descends the air will enter the open end of the piston 10 and travel up inside of the skirt 40. The air in the recessed spaces 48 and 50 will strike the shoulders 52 and 54 and be deflected radially inwardly through the passages 62 and 64 into the interior of the piston 10. The two blast of air from the two diametrically aligned passages 62 and 64 will be substantially identical and collide in the center of the piston 10. Since the two blast flow directly above the pin bosses 70 and 72 and the connecting rod 84 when they collide, they will tend to flow upward toward the top of the piston 10 along with the air from the bottom. When this vertical flow of air strikes the inside surface 104 of the end 18 it will flow radially outwardly and downwardly along the interior of the ring belt 22 forming a substantially toroidal flow pattern. As the air flows around the sharp turns any oil carried therein will be centrifugally thrown toward the outside of the air flow. Thus as the air strikes the surface 104 forming the upper end of the cavity 58 the oil will be thrown thereagainst, where it will collect as drops of oil 106. Thus any air flowing across the entrances 100 and 102 to the vents 96 and 98 will be free of oil and the air entering the vents will be clean. On the successive up strokes, any oil which may have collected on the surface 104 will be shaken loose and returned to the crankcase.

It is to be understood that, although the invention has been described with specific reference to a particular embodiment thereof, it is not to be so limited since changes and alterations therein may be made which are within the full intended scope of this invention as defined by the appended claims.

What is claimed is:

1. A piston comprising a closed end having a surface thereon adapted to form one wall of a combustion chamber, a cylindrical ring portion formed on said end, said ring portion including a plurality of annular ring receiving grooves separated by radially projecting lands, a skirt portion secured to said ring portion by pairs of piers, wrist pin bosses projecting inwardly into the interior of said skirt portion and being secured to the lower end of said piers, the piers in each pair being spaced to form passages extending inwardly through said portions parallel to and immediately above said pin bosses, vent means extending through one of said lands to form apertures on the inside of said cylindrical ring portion, all of said apertures being adjacent said inner ends of said passages.

2. A piston comprising a closed end having a surface thereon adapted to form one wall of a combustion chamber, a cylindrical portion secured to said end and forming a ring belt and a skirt, said skirt including a pair of diametrically aligned pin bosses, said ring belt including a plurality of annular ring receiving grooves disposed between said closed end and said pin bosses, said annular grooves being separated by radially projecting lands, passages formed to extend through said cylindrical portion for discharging air into said piston and vents extending through one of said lands to form an aperture on the inner surface of said cylindrical portion, all of said apertures being adjacent the inner ends of said passages.

3. A piston comprising a closed upper end having a surface thereon adapted to form one wall of a combustion chamber, a cylindrical portion secured to said end, said cylindrical portion including a skirt and a ring belt, said skirt having diametrically aligned pin bosses, passages extending radially through said cylindrical portion between said pin bosses and immediately above and substantially parallel to said pin bosses, said ring belt including a plurality of annular ring receiving grooves separated by lands, a pair of radially extending vents disposed in one of said lands, the inner ends of said vents forming openings on the interior of said piston, all of said openings being disposed between the inner ends of said passages and said closed end.

4. A piston comprising a closed upper end having a surface thereon adapted to form one wall of a combustion chamber, a cylindrical portion secured to said end, said cylindrical portion including a skirt and a ring belt, said skirt including diametrically aligned pin bosses, passages extending radially through said cylindrical portion between said pin bosses and immediately above and substantially parallel to said pin bosses, said ring belt including a plurality of ring receiving grooves separated by lands, one of said lands having an annular groove formed therein, a pair of radial vents extending through said land parallel to said passages, the radially outer ends of said vents forming openings in said groove, the radially inner ends of said vents forming openings on the inside of said piston, all of said last-mentioned openings being disposed between the radially inner ends of said passages and said end.

5. A piston for reciprocating movement in a cylinder comprising a closed end adapted to form one surface of a combustion chamber, a substantially cylindrical ring belt secured to said closed end and having a plurality of ring receiving grooves separated by lands, a skirt having an outside diameter substantially the same as the outside diameter of said ring belt, said skirt including a pair of thrust faces and a pair of diametrically disposed chordal webs securing the ends of said thrust faces together, the exterior surface of said webs being recessed inwardly from the outside diameter of said skirt to form a pair of spaces below said ring belt and between the exteriors of said webs and the surface of said cylinder, a pin boss formed in each of said webs, a pair of piers disposed above each of said pin bosses and spaced to form passages above said pin bosses extending radially inwardly from said spaces, each of said piers having one end thereof secured to one of said webs and said pin bosses, each of said piers having the other ends thereof secured to said ring belt, a substantially radial vent disposed above and parallel to each of said pin bosses, said vents extending through one of said lands in said ring belt to form openings on the inside of said ring belt, all of said last-mentioned openings being disposed above the inner ends of said passages.

6. A piston for reciprocating movement in a cylinder comprising a closed end adapted to form one surface of a combustion chamber, a substantially cylindrical ring belt secured to said closed end and having a plurality of ring receiving grooves separated by lands, a skirt having an outside diameter substantially the same as the outside diameter of said ring belt, said skirt including a pair of thrust faces and a pair of diametrically disposed chordal webs securing the ends of said thrust faces together, the exterior surface of said webs being recessed inwardly from the outside diameter of said skirt to form a pair of spaces below said ring belt and between the exteriors of said webs and the surface of said cylinder, a pin boss formed in each of said webs, a pair of piers disposed above each of said pin bosses and spaced to form passages above said pin bosses extending radially inwardly from said spaces, each of said piers having one end thereof secured to said ring belt, each of said piers having the other end thereof secured to one of said webs and pin bosses, one of said lands having an annular groove formed therein, a substantially radial vent disposed above and parallel to each of said pin bosses, the radially outer ends of said vents communicating with said groove, the radially inner ends of said vents forming openings on the interior of said ring belt, all of said openings being disposed above the radially inner ends of said passages.

7. A piston for reciprocating movement in a cylinder comprising a closed upper end adapted to form one surface of a combustion chamber, a substantially cylindrical ring belt secured below said upper end and having a plurality of ring receiving grooves separated by lands, a skirt having an outside diameter substantially the same as the outside diameter of said ring belt, said skirt including a pair of thrust faces and a pair of diametrically disposed chordal webs securing the ends of said thrust faces together, the exterior of said webs being recessed inwardly from the outside diameter of said skirt to form a pair of spaces below said ring belt and between the exterior of said webs and the surface of said cylinder, the bottom of said ring belt forming shoulders defining the upper ends of said spaces, a pin boss formed in each of said webs, a pair of piers disposed above each of said pin bosses, said piers being spaced to form passages above said pin bosses extending radially through said piston, said passages communicating with said recesses adjacent said shoulders, and a substantially radial vent disposed above and parallel to each of said pin bosses, said vents extending through one of said lands in said ring belt to form openings, all of said openings being disposed on the inside of said ring belt above the inner ends of said passages.

8. A piston for reciprocating movement in a cylinder comprising a closed upper end adapted to form one surface of a combustion chamber, a substantially cylindrical ring belt secured below said upper end and having a plurality of ring receiving grooves separated by lands, a skirt having an outside diameter substantially the same as the outside diameter of said ring belt, said skirt including a pair of thrust faces and a pair of diametrically disposed chordal webs securing the ends of said thrust faces together, the exterior of said webs being recessed inwardly from the outside diameter of said skirt to form a pair of spaces below said ring belt and between the exterior of said webs and the surface of said cylinder, the bottom of said ring belt forming shoulders defining the upper end of said spaces, a pin boss formed in each of said webs, a pair of piers disposed above each of said pin bosses, said piers being spaced to form passages above said bosses extending radially through said piston, said passages communicating with said recesses adjacent said shoulders, one of said lands having an annular groove formed therein, and a substantially radial vent disposed above and parallel to each of said pin bosses, the radially outer ends of said vents communicating with said groove, the radially inner ends of said vents forming openings on the inside of said ring belt, all of said openings being disposed above the radially inner ends of said passages.

9. A piston comprising a closed end having a surface thereon adapted to form one wall of a combustion chamber, a cylindrical ring portion formed on one end, said ring portion including a plurality of annular ring receiving grooves separated by radially projecting lands, a skirt portion having a pair of diametrically aligned pin bosses, a pair of piers extending between each of said pin bosses and said ring belt for securing said skirt thereto, each of said pairs of piers forming a pocket therebetween which is disposed between their respective pin boss and said closed end, vent means extending through one of said lands to form apertures on the inside of said cylindrical ring portion, all of said apertures being disposed in said pockets.

10. A piston comprising a closed upper end having a surface thereon adapted to form one wall of a combustion chamber, a cylindrical portion secured to said end, said cylindrical portion including a skirt and a ring belt, said skirt including diametrically aligned pin bosses, a pair of piers for each of said pin bosses, each of said pairs of piers extending axially from their respective pin boss to said end to form a pocket therebetween, said ring belt including a plurality of ring receiving grooves separated by lands, one of said lands having an annular groove formed therein, radial vents extending through said last-mentioned land, the radially outer ends of said vents forming openings in said groove, the radially inner ends of all of said vents forming openings in said pockets.

References Cited in the file of this patent

UNITED STATES PATENTS

| | | |
|---|---|---|
| 1,259,292 | Riedler | Mar. 12, 1918 |
| 1,634,037 | Muir | June 28, 1927 |
| 1,733,618 | Moore | Oct. 29, 1929 |
| 1,763,523 | Jardine | June 10, 1930 |